US012766669B2

(12) United States Patent
Zimmer et al.

(10) Patent No.: US 12,766,669 B2
(45) Date of Patent: Oct. 20, 2026

(54) WORKPIECE TABLE COMPRISING A PLURALITY OF WORKPIECE-CLAMPING FIXTURES

(71) Applicants: Martin Zimmer, Rheinau (DE); Günther Zimmer, Rheinau (DE)

(72) Inventors: Martin Zimmer, Rheinau (DE); Günther Zimmer, Rheinau (DE)

(*) Notice: Subject to any disclaimer, the term of this patent is extended or adjusted under 35 U.S.C. 154(b) by 415 days.

(21) Appl. No.: 18/289,394

(22) PCT Filed: May 5, 2022

(86) PCT No.: PCT/DE2022/000047
§ 371 (c)(1),
(2) Date: Feb. 5, 2024

(87) PCT Pub. No.: WO2022/233351
PCT Pub. Date: Nov. 10, 2022

(65) Prior Publication Data
US 2024/0238942 A1 Jul. 18, 2024

(30) Foreign Application Priority Data
May 5, 2021 (DE) .................... 10 2021 002 384.6

(51) Int. Cl.
*B25B 5/06* (2006.01)

(52) U.S. Cl.
CPC .................................. *B25B 5/061* (2013.01)

(58) Field of Classification Search
CPC .......... B25B 5/061; B23Q 1/66; B23Q 1/035; B23Q 1/525; B23Q 3/088
See application file for complete search history.

(56) References Cited

U.S. PATENT DOCUMENTS

| | | | | |
|---|---|---|---|---|
| 5,120,033 | A | 6/1992 | Shoda | |
| 5,364,083 | A | 11/1994 | Ross et al. | |
| 5,544,968 | A * | 8/1996 | Goellner | B25B 11/005 403/90 |
| 5,829,151 | A | 11/1998 | Collier et al. | |
| 9,597,757 | B2 * | 3/2017 | Pesenti | B23Q 1/766 |
| 2005/0015962 | A1 * | 1/2005 | Sturm, Jr. | B23Q 1/035 29/559 |
| 2009/0140482 | A1 | 6/2009 | Saberton et al. | |

(Continued)

FOREIGN PATENT DOCUMENTS

| | | | |
|---|---|---|---|
| CN | 112203815 | A | 1/2021 |
| DE | 10350572 | A1 | 6/2005 |

(Continued)

OTHER PUBLICATIONS

U.S. Appl. No. 18/289,401, filed Nov. 3, 2023, Martin Zimmer.

*Primary Examiner* — Seahee Hong
(74) *Attorney, Agent, or Firm* — Smartpat PLC

(57) ABSTRACT

A workpiece table includes a frame and at least one work-piece-clamping fixture having a plurality of individually height-adjustable pneumatic workpiece-clamping elements. The workpiece table has at least one second workpiece-clamping fixture having a plurality of pneumatic workpiece-clamping elements. All the workpiece-clamping fixtures can be moved relative to the frame. The workpiece table increases the throughput time of a batch of workpieces at a processing station.

11 Claims, 9 Drawing Sheets

(56) References Cited

U.S. PATENT DOCUMENTS

| | | | | |
|---|---|---|---|---|
| 2009/0169766 | A1 * | 7/2009 | Takahashi | H01J 37/3178 427/523 |
| 2017/0108717 | A1 | 4/2017 | Zhu et al. | |
| 2018/0236638 | A1 * | 8/2018 | Olberg | B25H 1/18 |
| 2019/0224790 | A1 | 7/2019 | Bettermann et al. | |

FOREIGN PATENT DOCUMENTS

| | | | |
|---|---|---|---|
| DE | 102016217003 | A1 | 3/2018 |
| DE | 102017217878 | A1 | 4/2019 |
| EP | 2433761 | B1 | 12/2012 |
| EP | 3838475 | A1 | 7/2023 |
| FR | 2094268 | | 2/1972 |
| JP | H11123685 | A | 5/1999 |
| WO | 0178947 | A1 | 10/2001 |

* cited by examiner

WORKPIECE TABLE COMPRISING A PLURALITY OF WORKPIECE-CLAMPING FIXTURES

CROSS-REFERENCE TO RELATED APPLICATION

This application is a national stage application, filed under 35 U.S.C. § 371, of International Patent Application PCT/DE2022/000047, filed on May 5, 2022, which claims the benefit of German Patent Application DE 10 2021 002 384.6, filed on May 5, 2021.

TECHNICAL FIELD

The disclosure relates to a workpiece table comprising a frame and comprising at least one workpiece-clamping fixture having a plurality of individually height-adjustable pneumatic workpiece-clamping elements.

BACKGROUND

A clamping table with pneumatic workpiece-clamping elements is known from DE 103 50 572 A1. The height adjustment takes place in each case by means of an electric motor and a spindle.

DE 10 2016 217 003 A1 shows a horizontal workpiece table of a portal machine. Height-adjustable workpiece-clamping elements are arranged in the workpiece table in each case by means of an electric motor and a spindle.

SUMMARY

The present disclosure allows increasing the throughput time of a batch of workpieces at a processing station.

This is achieved by the features of the main claim. For this purpose, the workpiece table has at least one second workpiece-clamping fixture having a plurality of pneumatic workpiece-clamping elements. All the workpiece-clamping fixtures can be moved relative to the frame.

The design of the workpiece table with a plurality of workpiece-clamping fixtures enables workpieces to be configured on one workpiece-clamping fixture, while other workpieces are being processed on a further workpiece-clamping fixture. Once processing is complete, the workpiece-clamping fixtures are adjusted relative to the frame such that the processed workpieces can be removed and the new workpieces to be processed can enter the working chamber. This means that the non-productive time for setting up the workpieces does not affect the throughput time of the batch at the processing station.

Further details of the invention are given in the subclaims and the following description of schematically illustrated embodiments.

DETAILED DESCRIPTION

Figure 1:
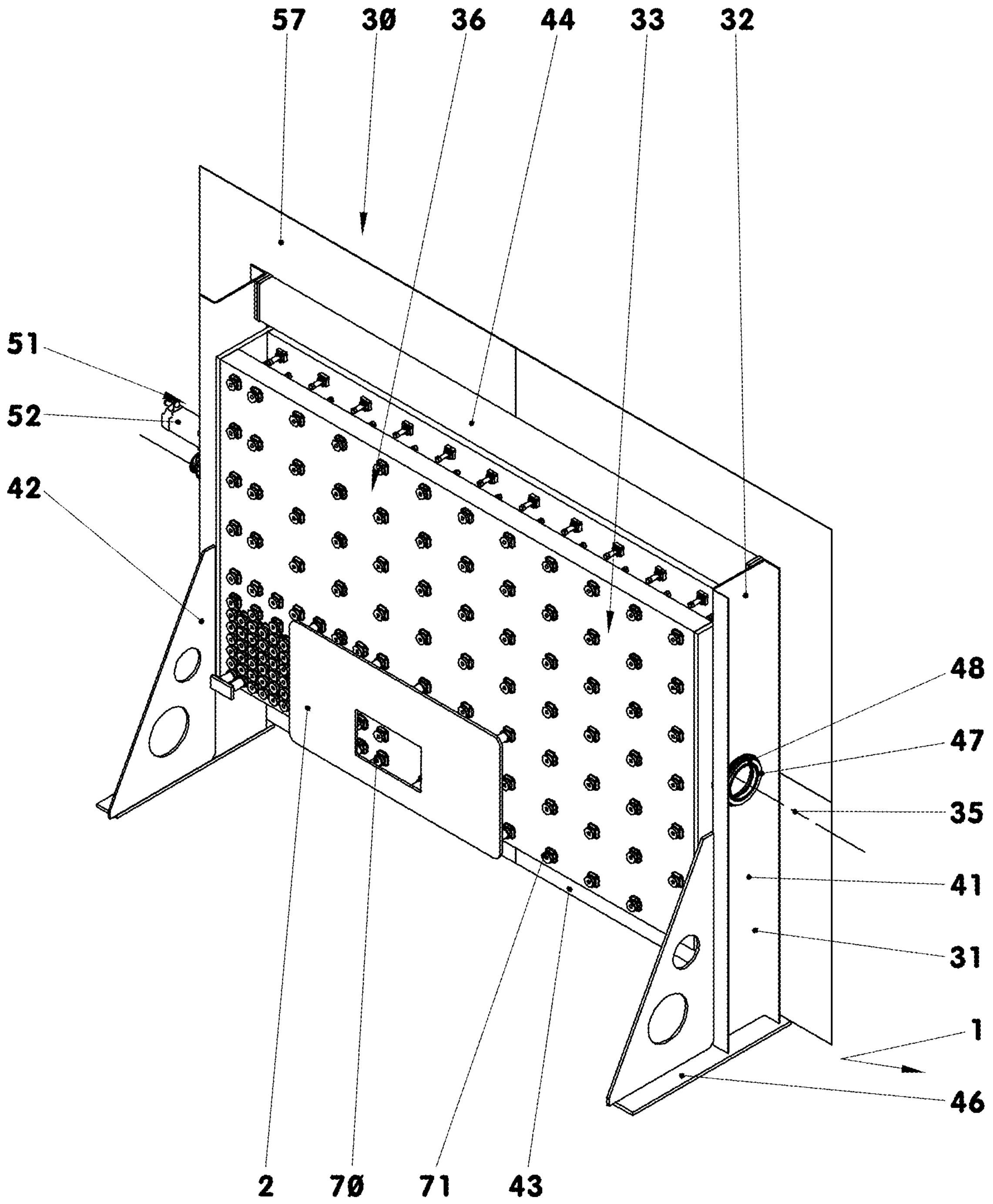
FIG. 1: Workpiece table.

FIGS. 1-12 show a workpiece table (30) and some of its individual parts. The workpiece table (30) has a frame (31) in which a workpiece plate carrier (32) with workpiece-clamping fixtures (33, 34) is pivotably mounted. In the representation in FIG. 1, the workpiece table (30) has two workpiece-clamping fixtures (33, 34). The workpiece-clamping sides (36, 37) of such workpiece-clamping fixtures (33, 34) point in opposite directions in this exemplary embodiment.

The pivot axis (35), about which the workpiece plate carrier (32) can be pivoted relative to the frame (31), is oriented horizontally in this exemplary embodiment. A pivot drive (51) is arranged on the frame (31) to drive the workpiece plate carrier (32). In the exemplary embodiment, the workpiece plate carrier (32) with the workpiece-clamping fixtures (33, 34) can be pivoted from the position shown in FIG. 1 through a pivot angle of 180 degrees around the pivot axis (35) and back again. However, it is also conceivable to arrange the workpiece plate carrier (32) so that it can rotate relative to the frame (31). In this case, the workpiece plate carrier (32) can be rotated 360 degrees or more about the axis of rotation. The pivot axis (35) or the axis of rotation of the workpiece table (30) can also be oriented vertically.

The workpiece plate carrier (32) can carry more than two workpiece-clamping fixtures (33, 34). In this case, the pivot or rotation angle between the individual positions is 360 degrees, divided by the number of workpiece-clamping fixtures (33, 34). In this case as well, each of the workpiece-clamping fixtures (33, 34) is oriented in a different direction.

Figure 13:
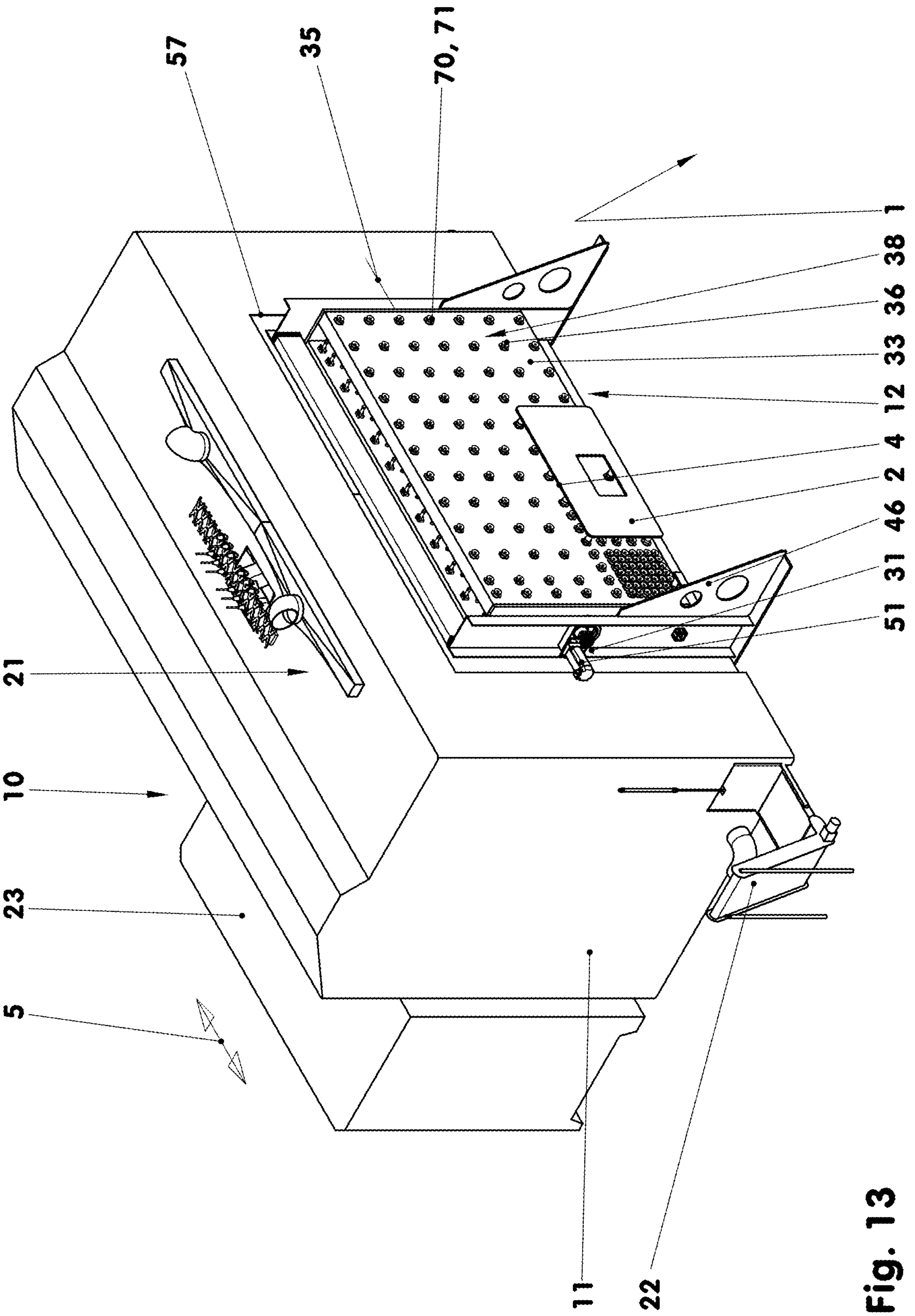
FIG. 13: Processing cell.

FIG. 13 shows a processing cell (10). The processing cell (10) has an internal working chamber that is surrounded by an enclosure (11). Such enclosure (11) has an overhead air supply device (21). A chip conveyor (22) is arranged in the longitudinal direction (5) of the processing cell (10), which conveys chips accumulating in the working chamber out of the enclosure (11). In such representation, there are control cabinets (23) next to the enclosure (11). The control unit for workpiece processing is located in such control cabinets (23). In the exemplary embodiment, processing is carried out with a stationary workpiece (2; 3) by means of a processing robot.

The workpiece table (30) is arranged in the enclosure (11) on a loading side (12) of the processing cell (10). The workpiece table (30) is integrated into the enclosure (11). The workpiece table (30) delimits the working chamber of the processing cell (10). The workpiece-clamping fixture (33), which is oriented towards the surrounding area (1) in this representation, is in a loading and removal position (38).

In the material flow of the processing cell (10), a workpiece (2; 3) to be processed is placed on the workpiece-clamping fixture (33; 34), for example by means of a handling device or by hand, and held there by means of negative pressure. In order to process the workpiece (2, 3), the workpiece (2, 3) is pivoted about the pivot axis (35) into the working chamber by means of the workpiece plate carrier (32). At the same time, the other workpiece-clamping fixture (34; 33) with, for example, a processed workpiece (3;

2) moves from the working chamber to the loading and removal position (38). In both positions, the workpiece table (30) seals the processing cell (10) against the surrounding area (1). The processed workpiece (3; 2) can now be removed by means of a handling tool or by hand and fed for further processing.

Figure 2:
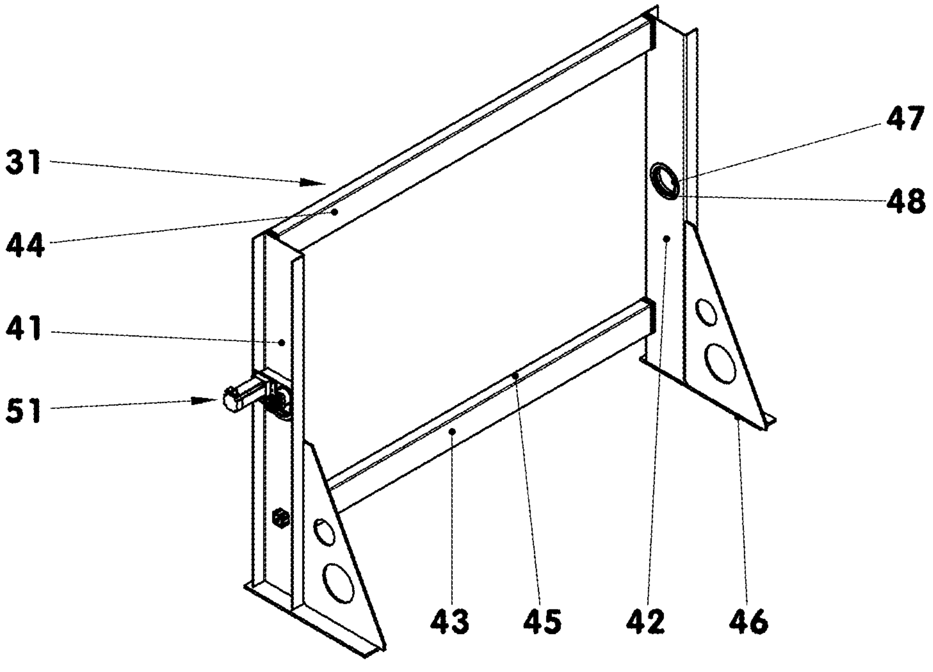
FIG. 2: Frame.

FIG. 2 shows the frame (31) of the workpiece table (30). It has two vertical carriers (41) spaced apart from one another, which are connected to one another by means of a lower longitudinal carrier (43) and an upper longitudinal carrier (44). The feet (46) at the bottom are arranged asymmetrically to the vertical carriers (41), for example. When in use, see FIG. 13, the feet (46) protrude further outwards than inwards.

Bearing points (47) for the pivot bearing of the workpiece plate carrier (32) are formed in the vertical carriers (41) in each case. For example, one roller bearing (48) is used in each case in the form of a slewing ring. This, for example multi-row, slewing ring (48) has, for example, radially oriented cylindrical rollers and an axially oriented spherical roller body. One of the bearing points can be designed as a fixed bearing point, the other as a floating bearing. It is also conceivable to design the bearing points (47) with spherical roller bearings, angular ball bearings, etc.

In the representations in FIGS. 1 and 13, outwardly projecting sealing plates (57) are arranged on the vertical carriers (41) and on the longitudinal carriers (43, 44). When using the workpiece table (30), see FIG. 13, such sealing plates (57) are in contact with the enclosure (11) of the processing cell (10), for example. In addition, one or more inflatable hoses, for example, can be used to create a seal between the workpiece table (30) and the enclosure (11). These are arranged, for example, both on the inner sides (42) of the vertical carriers (41) and on the inner sides (45) of the longitudinal carriers (43, 44). When a workpiece-clamping fixture (33; 34) is in a working chamber position, such, for example inflatable, air hoses surround such workpiece-clamping fixture (33; 34). Prior to pivoting the workpiece plate carrier (32), the air hoses can be relieved by draining or relocating the filling air. Other designs for sealing off the working chamber against the surrounding area (1) are also conceivable.

The pivot drive (51) is arranged on the left vertical carrier (41) in the representation in FIG. 2. This has an electric drive motor (52). In the exemplary embodiment, the drive motor (52) is an electric motor in the form of a geared motor. For example, it can be designed as a servomotor.

The pivot drive (51) further comprises a locking mechanism. By means of such locking mechanism, the workpiece plate carrier (32) can be locked relative to the frame (31) in at least one angular position in which one of the workpiece-clamping fixtures (33, 34) is in a vertical working chamber position, for example. In the exemplary embodiment, when one of the workpiece-clamping fixtures (33; 34) is in the working chamber position, exactly one other workpiece-clamping fixture (34; 33) is in a loading and removal position (38) outside the enclosure (11).

Figure 3:
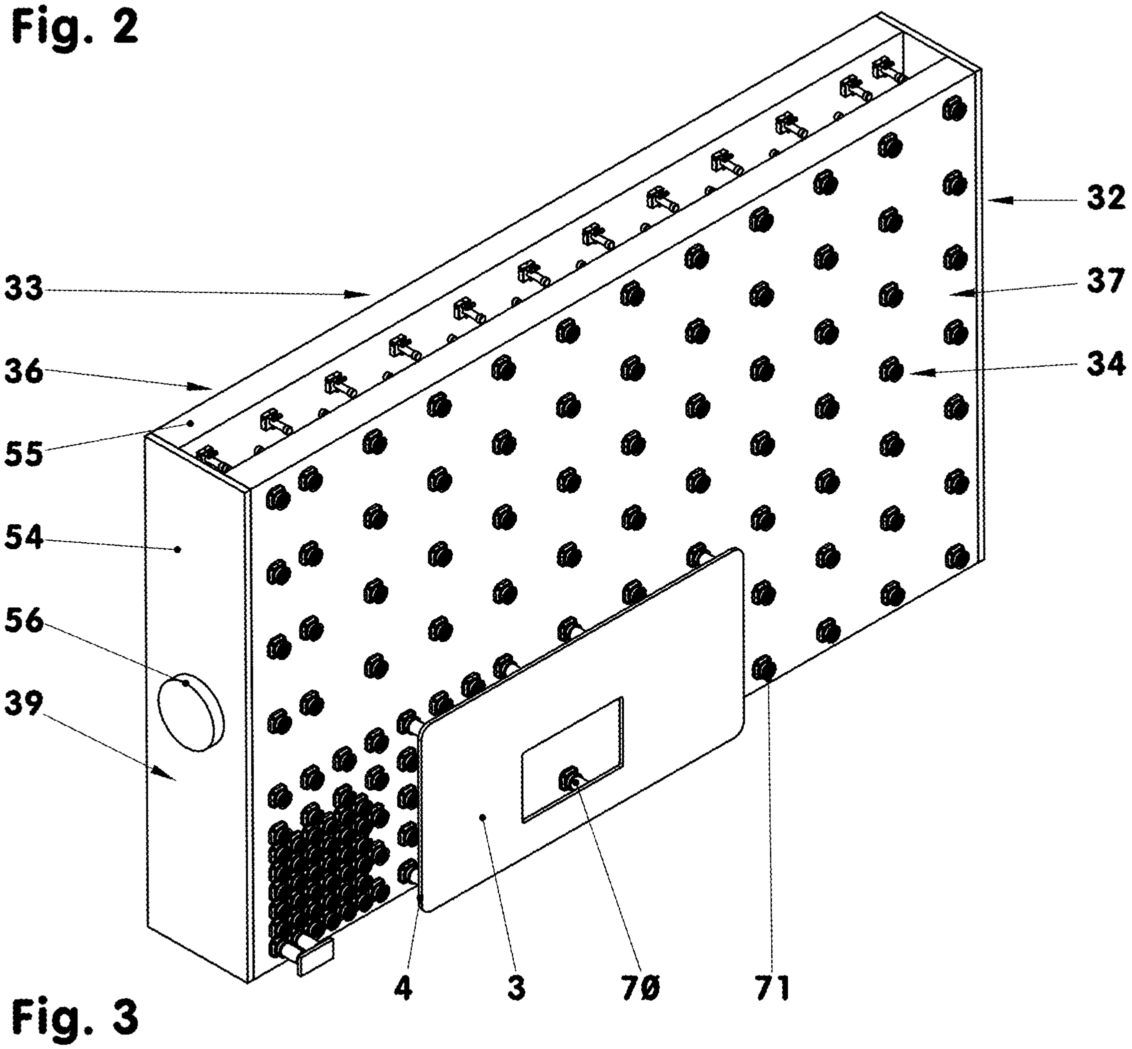
FIG. 3: Workpiece plate carrier with workpiece-clamping plates.

FIG. 3 shows the workpiece plate carrier (32). It comprises a carrier part (54) on both end faces (39), which are connected by means of two carrier plates (55). Each of the two carrier parts (54) carries a pivot pin (56), with which the workpiece plate carrier (32) is mounted in the frame (31) in the representations in FIGS. 1 and 13. The media supply to the workpiece plate carrier (32), for example, passes through such pivot pin (56). Such media supply comprises electrical power, control and data lines along with pneumatic and/or hydraulic control, pressure and suction lines.

In the exemplary embodiment, the two carrier plates (55) are arranged parallel to one another. Each of the carrier plates (55) determines a workpiece-clamping side (36, 37). The surface of the individual workpiece-clamping side (36, 37) corresponds, for example, to the maximum workpiece support surface. In the exemplary embodiment, workpieces with a length of up to 3600 millimeters and a width of up to 2100 millimeters can be clamped on each of the workpiece-clamping fixtures (33; 34). The thickness of the individual carrier plate (55) is, for example, 4% of its length.

In one version of the workpiece table (30) with three workpiece-clamping fixtures (33, 34), this has three carrier plates (55). Such carrier plates (55) are arranged in an equilateral triangle in an end view of the workpiece table (30). When viewed in the longitudinal direction (5) of the pivot axis (35) or the axis of rotation, the individual workpiece-clamping fixture (33; 34) is vertical in the loading and removal position (38) in the exemplary embodiment. However, the workpiece-clamping fixture (33; 34) can also form an angle of up to and including 30 degrees with a vertical plane that contains the pivot axis (35) or the axis of rotation, wherein the cutting line lies above the pivot axis (35) or the axis of rotation. For example, each carrier plate (55) has the same maximum workpiece support surface. It is also conceivable to design the workpiece table (30) with more than three workpiece-clamping fixtures (33, 34).

Each carrier plate (55) carries a workpiece-clamping fixture (33; 34). In the exemplary embodiment, the two workpiece-clamping fixtures are designed identically. However, it is also conceivable to use differently designed workpiece-clamping fixtures (33; 34) on the individual carrier plates (55).

The individual workpiece-clamping fixture (33; 34) has a plurality of workpiece-clamping elements (70; 71). In the exemplary embodiment, these are arranged in rows and columns on the carrier plate (55). The arrangement of the workpiece-clamping elements (70; 71) is compacted in a region at the bottom left of the representation in FIG. 3. With such matrix-like arrangement, the distance between the workpiece-clamping elements (70; 71) arranged next to one another in a row within the respective compaction region corresponds, for example, to the distance between the workpiece-clamping elements (70; 71) arranged one above the other in a column. Such distances can also be designed differently.

The workpiece-clamping elements (70; 71) can also be arranged, for example, in concentric circles, spirals, along a diagonal pattern, etc. The formation of a plurality of regions with different compaction is also conceivable.

The individual workpiece-clamping elements (70; 71), for example, are identical to one another. In the workpiece-clamping fixture (33, 34), each of such workpiece-clamping elements (70; 71) can be controlled individually pneumatically, hydraulically and/or electrically. The signals of a measuring and/or testing system of each individual workpiece-clamping element (70; 71) can be recorded individually.

Figure 4:
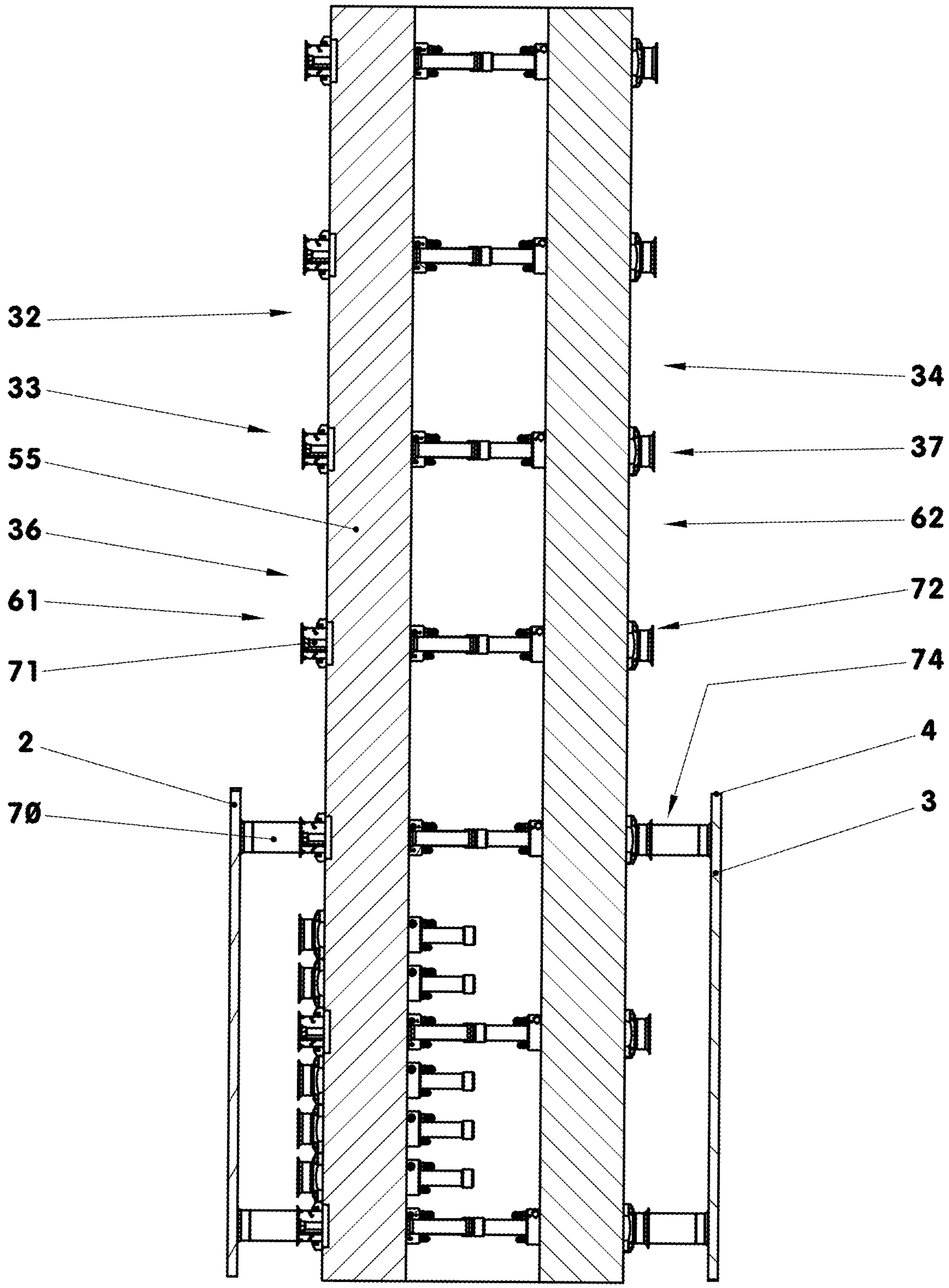
FIG. 4: Cross section of the workpiece-clamping plates.

FIG. 4 shows a sectional representation of the workpiece plate carrier (32) with the workpiece-clamping fixtures (33, 34). In this representation, for example, an current loading side (61) is shown on the left and an current working chamber side (62) on the right. The individual workpiece-clamping elements (70; 71) in each case penetrate a carrier plate (55) and are fastened to it. Each workpiece-clamping element (70; 71) has a cylinder (81) and a telescopic tube (101) that can be adjusted electrically, hydraulically or pneumatically relative to the cylinder (81). A suction plate (111) is arranged at the free end of the telescopic tube (101). The telescopic tube (101) is aligned normal to the carrier plate (55). The stroke of the workpiece-clamping element (70; 71) is 100 millimeters, for example. The diameter of the cylinder (81) is, for example, 70% of the stroke.

The loading side (61) and the working chamber side (62) in each case carry a workpiece (2; 3) in the representation in FIG. 4. This rests in each case on two workpiece-clamping elements (70). These two workpiece-clamping elements (70) are in an operating position (74), in which the telescopic tube (101) is fully extended. The remaining workpiece-clamping elements (71) are shown in a retracted end position (72). The adjustment of the workpiece-clamping elements (70; 71) can also take place in steps between the retracted end position (72) and an extended end position (73). It is also conceivable, for example, to steplessly adjust any intermediate position between the retracted end position (72) and the extended end position (73). In the exemplary embodiment shown, the adjustment of the workpiece-clamping elements (70; 71) takes place pneumatically, for example.

Figure 5:
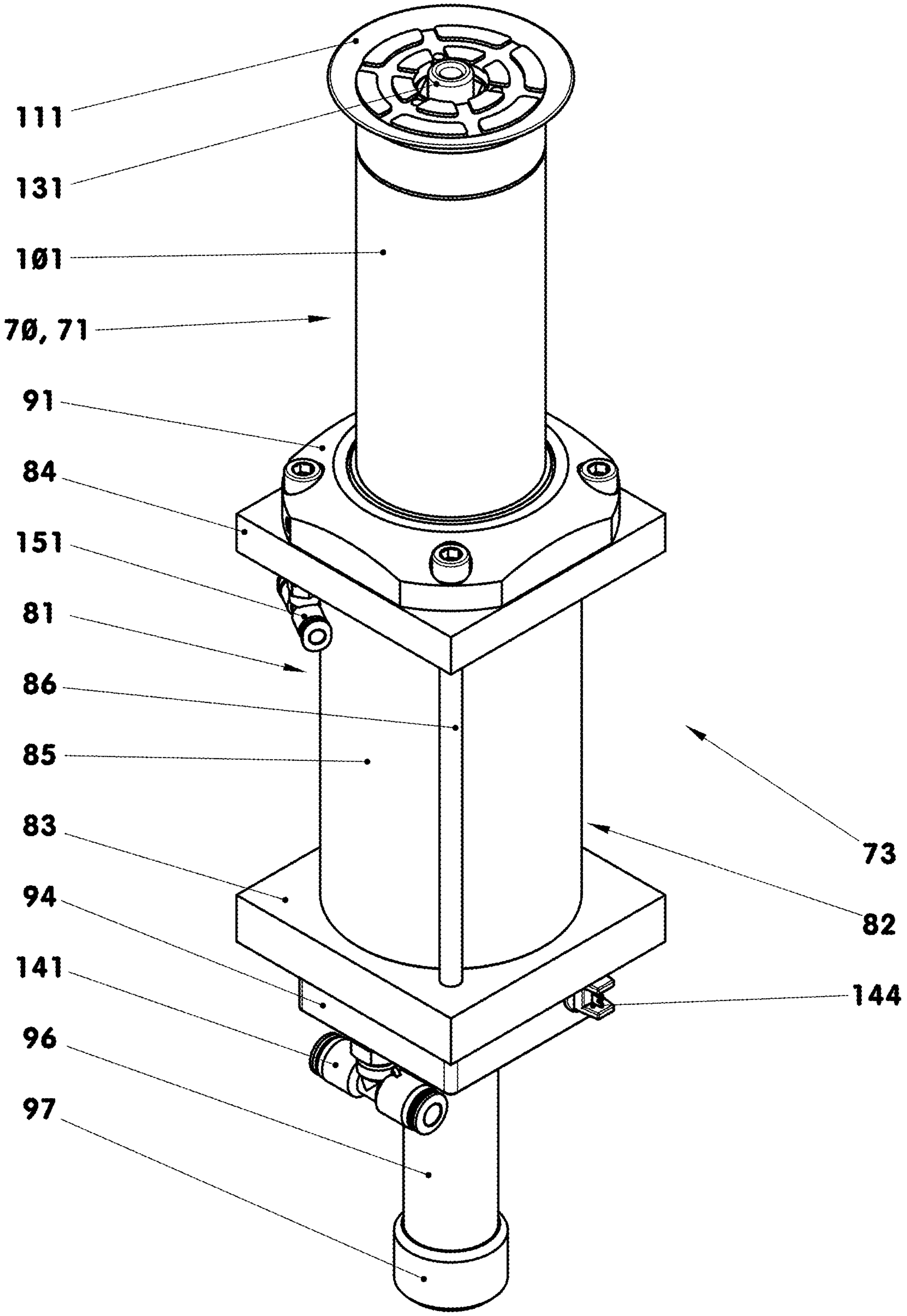
FIG. 5: Workpiece-clamping element.

FIG. 5 shows a workpiece-clamping element (70; 71) in the extended end position (73) without a workpiece (2; 3) resting on it. The workpiece-clamping element (70; 71) has a cylinder-piston unit (82), the cylinder (81) of which is designed as a tie rod cylinder in this exemplary embodiment. The cylinder (81) has a cylinder bottom (83) designed in a plate shape and a cylinder head cover (84) designed in a plate shape. The cylinder bottom (83) and the cylinder head cover (84) are parallel to one another, for example. Together they support a cylinder jacket tube (85). The cylinder jacket tube (85) has a constant internal diameter and a constant wall thickness over its length. A plurality of external tie rods (86) penetrate the cylinder bottom (83) and the cylinder head cover (84). In addition, such tie rods (86) penetrate a distribution cover (91) located on the cylinder head cover (84). In the representation in FIG. 5, the telescopic tube (101) with the suction plate (111) arranged on it projects from such distribution cover (91). A bottom distribution plate (94) is screwed to the cylinder bottom (83), for example. A protective tube (96) with a protective cap (97) at the bottom projects from the bottom distribution plate (94).

In the exemplary embodiment, the individual workpiece-clamping element (70; 71) has three pneumatic connections (141, 151, 161). Such pneumatic connections (141, 151, 161) are a lifting connection (141), a return lifting connection (151) and a suction connection (161). The return lifting connection (151) is arranged on the lower side of the cylinder head cover (84) in the representation in FIG. 5. In this representation, the lifting connection (141) and the suction connection (161) are arranged opposite one another on the lower side of the bottom distribution plate (94). Furthermore, a switching valve (144) for releasing and blocking the lifting connection (141) is arranged in the bottom distribution plate (94). The switching valve (144), for example a 3/2-way valve, is electromagnetically actuated in the exemplary embodiment. The use of a throttle valve is also conceivable.

Figure 6:
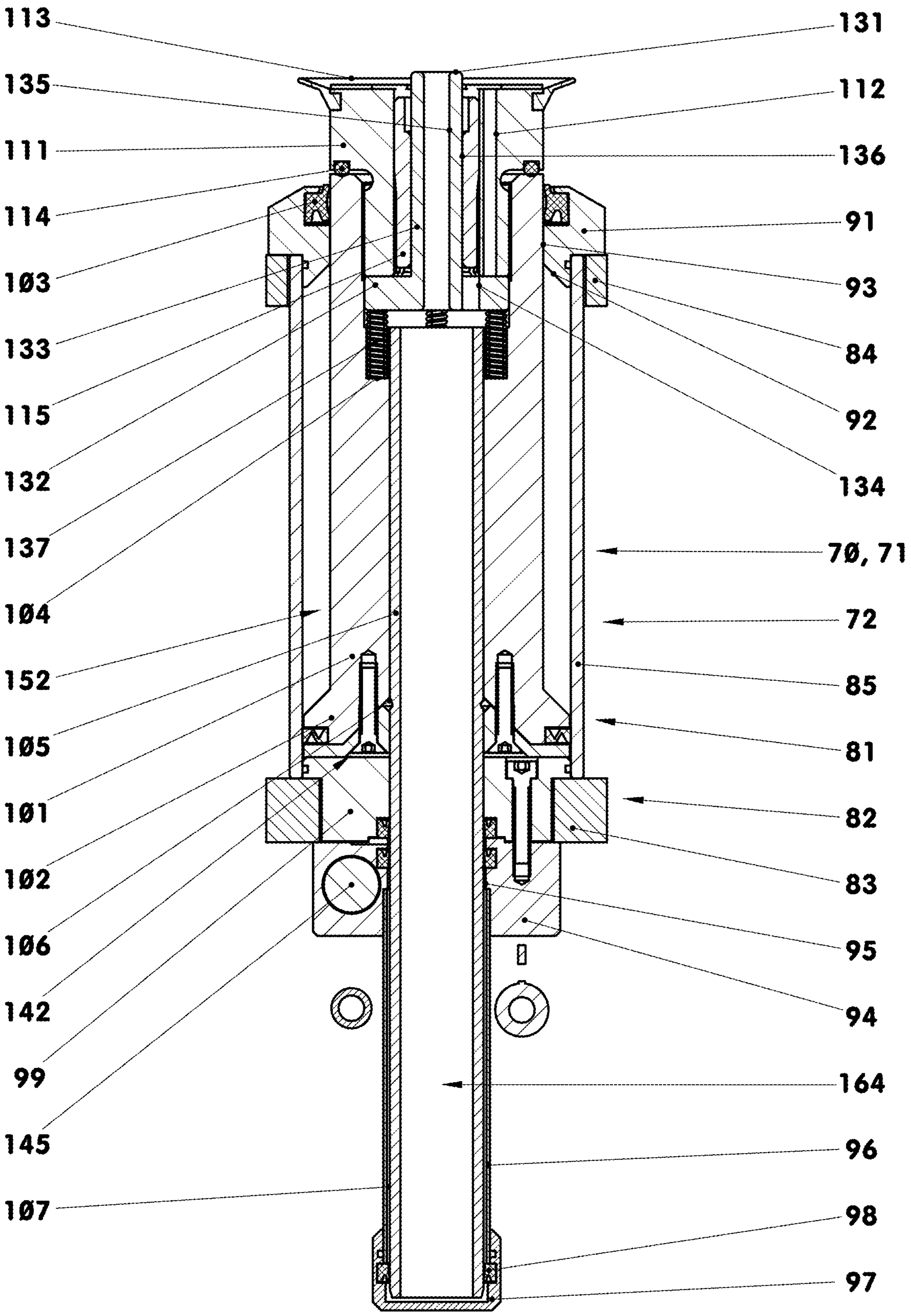
FIG. 6: Workpiece-clamping element in the retracted end position.

FIG. 6 shows a sectional view of a workpiece-clamping element (71; 70) in the retracted end position (72). The telescopic tube (101) is retracted such that the suction plate (111) only protrudes beyond the cylinder head cover (84) by a small amount, for example 9% of the total height of the retracted workpiece-clamping element (71; 70). The telescopic tube (101) is guided in a sealed manner in the distribution cover (91) and in the cylinder jacket tube (85). The lower end of the telescopic tube (101) is designed as a lifting piston (102). Such lifting piston (102) delimits a displacement chamber (152) from a pressure chamber (142) within the cylinder (81). Thereby, the displacement chamber (152) is located between the lifting piston (102) and the distribution cover (91). The pressure chamber (142) is located between a bottom ring (99) located in the cylinder bottom (83) and the lifting piston (102).

The side of the lifting piston (102) turned towards the distribution cover (91) is designed to be frustoconical. The imaginary cone tip is located on a center line of the workpiece-clamping element (70; 71) offset in the direction of the suction plate (111) in relation to the lifting piston (102). A frustoconical recess (92) complementary to the lifting piston (102) is formed in the distribution cover (91).

Figure 7:
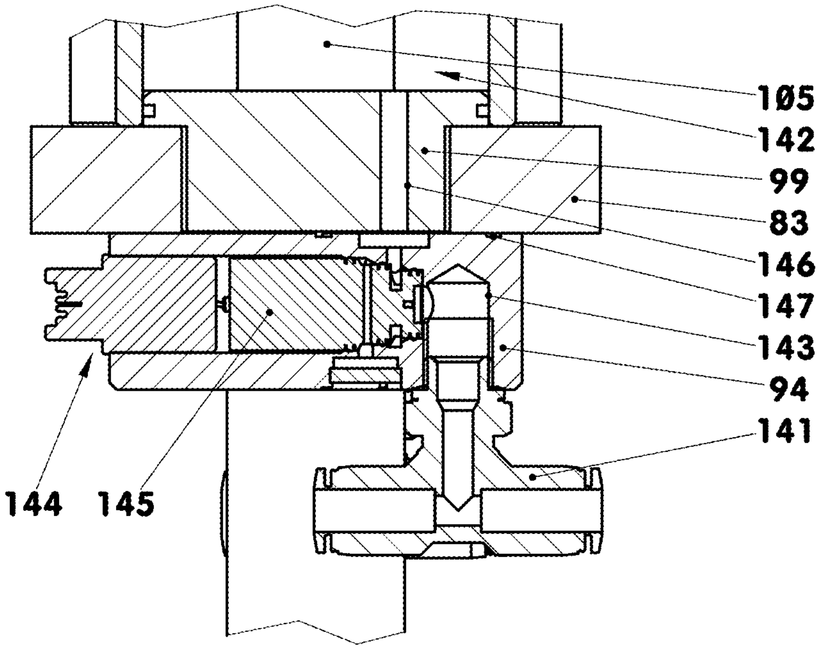
FIG. 7: Detail of the lifting connection.

FIG. 7 shows a detail of the lifting connection (141) and its connection to the pressure chamber (142). The pressure chamber is shown in this representation with its maximum volume. The T-shaped lifting connection (141) is screwed into the bottom distribution plate (94). A first feed channel (143) runs in the bottom distribution plate (94) to a valve slide (145) of the switching valve (144). A second feed channel (146) runs from the valve slide (145) through the bottom ring (99) to the pressure chamber (142). A throttle channel (147) connects a second valve position with the surrounding area (1).

Figure 8:
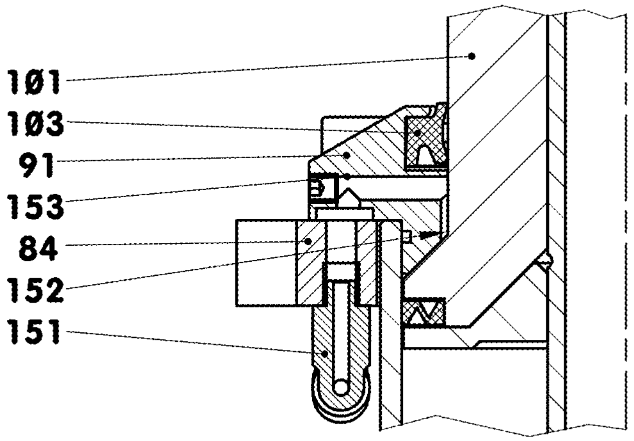
FIG. 8: Detail of the return lifting connection.

FIG. 8 shows the connection of the return lifting connection (151) to the displacement chamber (152). In this representation, the workpiece-clamping element (70; 71) is also in the extended end position (73). The return lifting connection (151) is screwed into the cylinder head cover (84). A return lifting channel (153) is guided into the distribution cover (91). There, the return lifting channel (153) opens below the cylinder seal (103) at the feed-through recess (93) of the distribution cover (91) in the displacement chamber (152).

An inner tube (105) is located in the telescopic tube (101). The inner tube (105) is firmly connected to the telescopic tube (101), for example by means of a wedge press connection (106), such that the inner tube (105) is carried along when the telescopic tube (101) is lifted. The inner tube (105) has a cylindrical inner wall and is open at both end faces. The inner diameter of the inner tube (105) is, for example, a quarter of the outer diameter of the cylinder jacket tube (85). In the exemplary embodiment, the length of the inner tube (105) is 2.3 times the stroke of the workpiece-clamping element (70; 71).

In the retracted end position (72) shown in FIG. 6, the inner tube (105) projects into the protective tube (96). There is an annular gap (107) between the protective tube (96) and the inner tube (105) along the entire length of the protective tube (96). The protective cap (97) carries a shaft seal ring (98), into which the inner tube (105) is immersed during lowering.

The suction plate (111) is screwed into the free end of the telescopic tube (101). A sealing ring (114) seals the lower side of the suction plate (111) against the telescopic tube (101). The suction plate (111) has, for example, three suction channels (112) penetrating the suction plate (111) in its longitudinal direction. The diameter of the workpiece support surface (113) of the suction plate (111) is, for example, 95% of the diameter of the cylinder (81).

A clamping and guide sleeve (115) is screwed into the suction plate (111), for example. The clamping and guide sleeve (115) secures the position of the suction plate (111) relative to the telescopic tube (101). For example, to adjust the individual suction plates (111) to a common working plane, the clamping and guide sleeve (115) is released and fixed again after adjustment.

A displacement rod (131) is located in the clamping and guide sleeve (115). The displacement rod (131) has a carrier disk (132) and a thrust tube (133) formed centrally on the carrier disk (132). The, for example, plane-parallel carrier disk (132) has three apertures (134) oriented in the longitudinal direction of the displacement rod (131). A central channel (135) penetrates the carrier disk (132) and the thrust tube (133). The thrust tube (133) has a constant circular inner cross-sectional area along its length. The jacket surface (136) of the thrust tube (133) is designed to be coaxial with the inner cross-sectional area.

Four spring mounts (104) are stamped into the end face of the telescopic tube (101) turned towards the displacement rod (131). In each case, a spring energy store (137) is located in each of such spring mounts (104). In the exemplary embodiment, the spring energy store (137) is a compression spring (137). Such compression springs (137) load the displacement rod (131), which can be displaced relative to the telescopic tube (101), in the direction of the suction plate (111). When the spring energy stores (137) are relieved, see FIGS. 6 and 10, the carrier disk (132) is in contact with the suction plate (111). The free end of the thrust tube (133) protrudes, for example, 1.5 millimeters beyond the workpiece support surface (113) of the suction plate (111). In the case of loaded spring energy stores (137), see FIG. 11, the carrier disk (132) is only a short distance from the telescopic tube (101) or is in contact with it. In the representation in FIG. 11, for example, the thrust tube (133) is located slightly below the workpiece support surface (113) of the suction plate (111).

Figure 9:
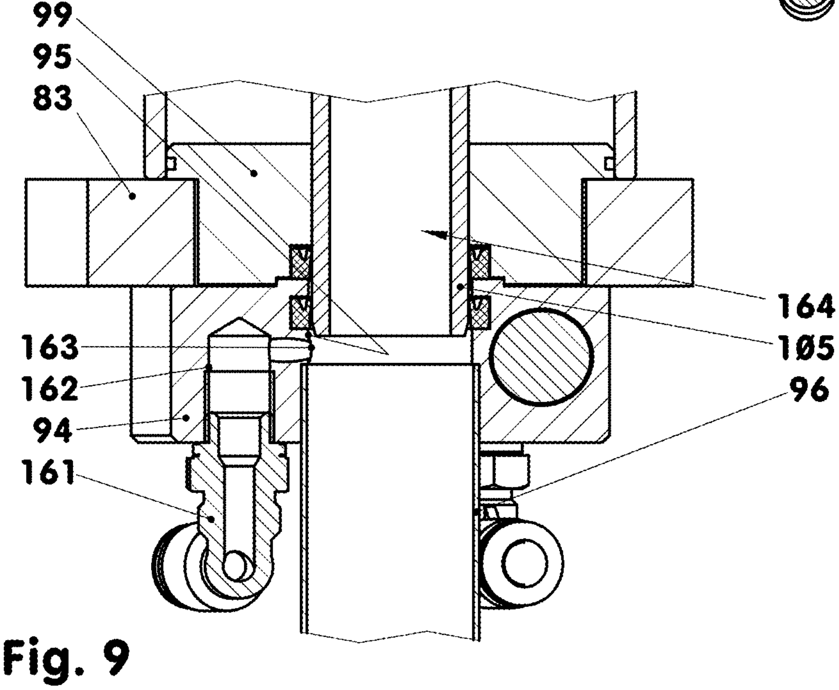
FIG. 9: Detail of the suction connection.

FIG. 9 shows the suction connection (161) and the first section of the suction channel (162). In this representation as well, the telescopic piston (101) is extended to its maximum stroke. The suction connection (161) is screwed into the bottom distribution plate (94). The suction channel (162) leads at an angle to the inner wall (95) of the bottom distribution plate (94). Here, it flows into the central inner chamber (164) of the workpiece-clamping element (70; 71). In this representation, the opening cross-section (163) of the suction channel (162) is located between the inner tube (105) and the protective tube (96). The inner tube (105) is sealed against the bottom ring (99) and the bottom distribution plate (94). In the representation in FIG. 6, the inner tube (105) covers the opening cross-section (163).

Figure 10:
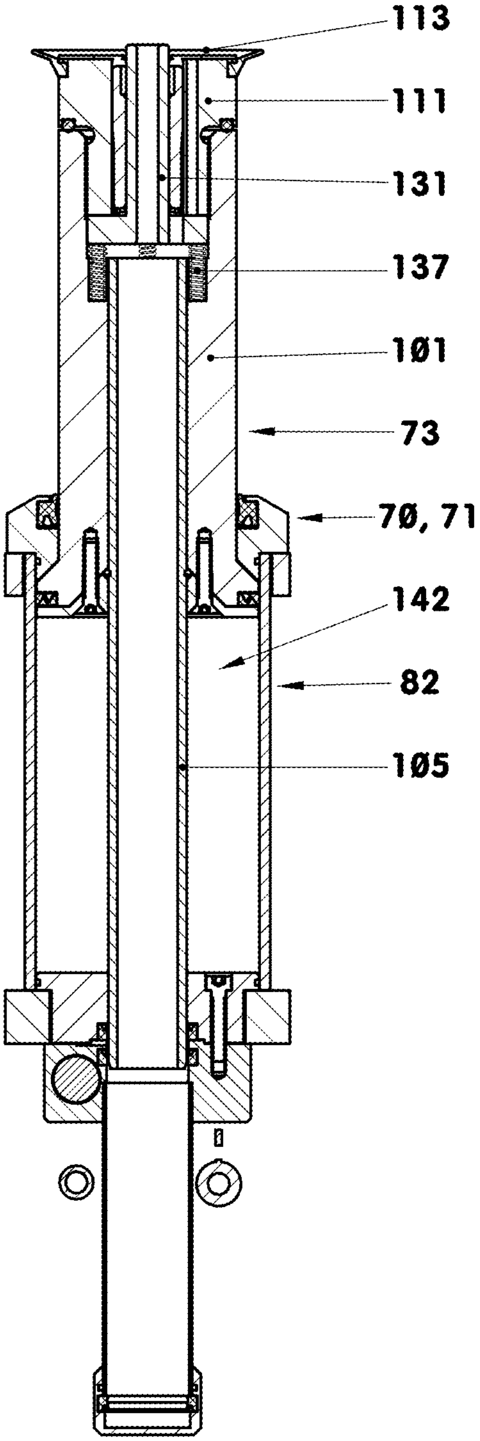
FIG. 10: Workpiece-clamping element in the extended end position.

FIG. 10 shows the workpiece-clamping element (70; 71) with the telescopic tube (101) extended. The workpiece-clamping element (70; 71) is shown in its extended end position (73). The pressure chamber (142) has its maximum volume. The telescopic tube (101) rests with its lifting piston (102) in the conical recess (92) of the distribution cover (91). The inner tube (105) is in the position described in connection with the representation of FIG. 9, such that the suction connection (161) is pneumatically connected to the inner chamber (164), the inner tube (105) and the channel (135) of the thrust tube (133). The displacement rod (131) is extended, as described in connection with FIG. 6. For example, the carrier disk (132) of the displacement rod (131) blocks the suction channels (112) of the suction plate (111).

Figure 11:
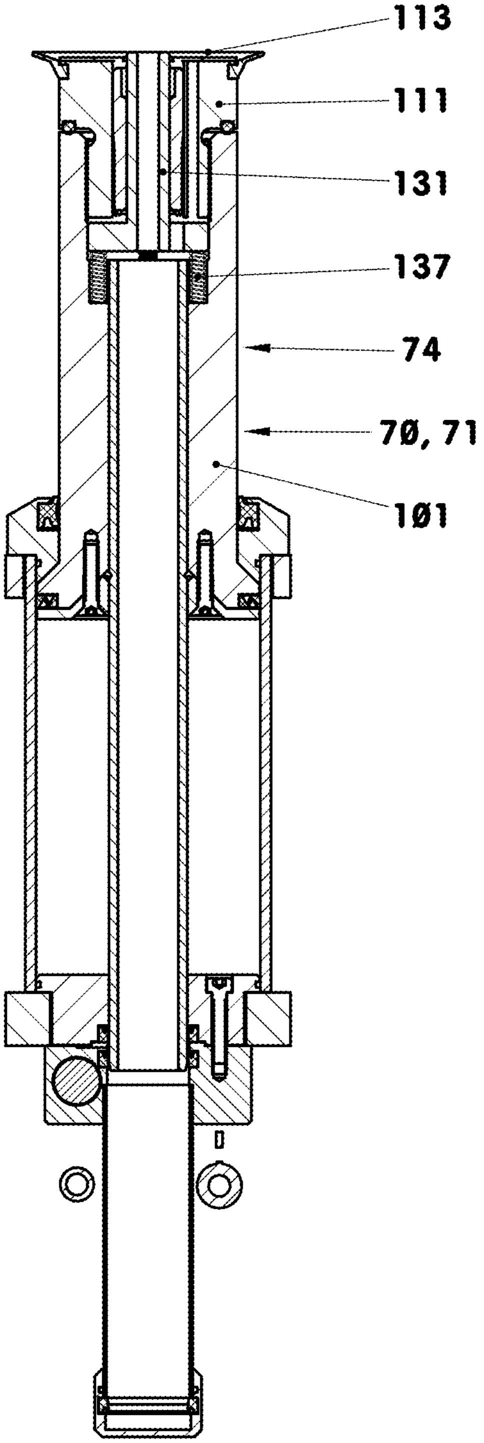
FIG. 11: Workpiece-clamping element in the operating position.
Figure 12:
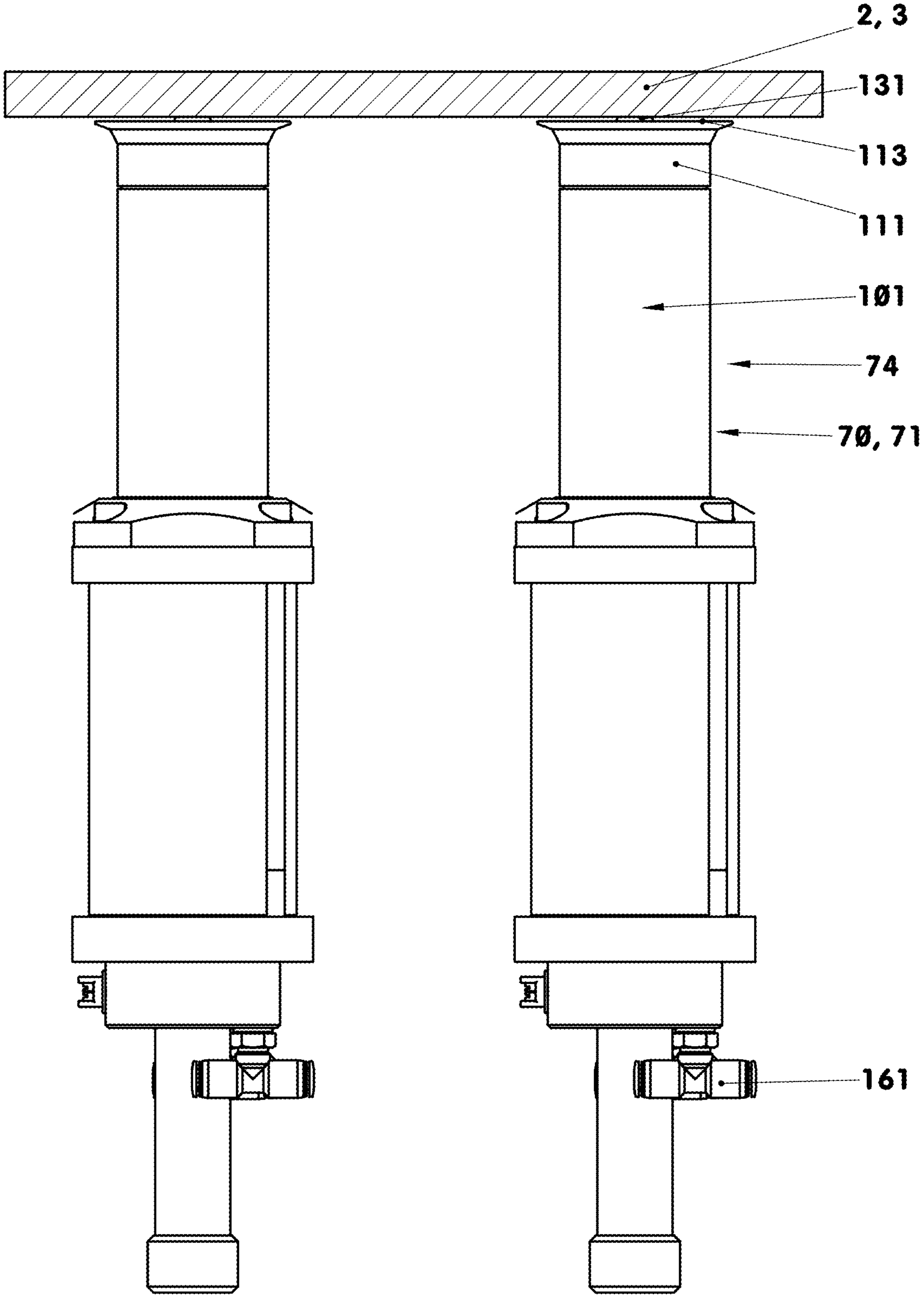
FIG. 12: Workpiece-clamping plate with lifted workpiece.

FIG. 11 shows an operating position (74) of the workpiece-clamping element (70; 71). The telescopic tube (101) is extended as described in connection with FIG. 10. The displacement rod (131) is retracted relative to the suction plate (111). The compression springs (137) are compressed.

When the processing cell (10) and/or the workpiece table (30) is in a resting state, all workpiece-clamping elements (70; 71) are in the respective retracted end position (72). The lifting connections (141), the return lifting connections (151) and the suction connections (161) are depressurized, for example. If necessary, the lifting connections (141) and/or the return lifting connections (151) can be in a blocked position, such that the respective pressure chamber (142) and/or the displacement chamber (152) are completely separated from the surrounding area (1) and from the compressed air supply.

For clamping a workpiece (2; 3) onto the workpiece-clamping fixture (33; 34), the lifting connections (141) of individual workpiece-clamping elements (70; 71) are connected to the compressed air supply, for example. The return lifting connections (151) of all workpiece-clamping elements (70; 71) are subjected to a constant pressure of, for example, 3 bar. In the case of hydraulically actuated workpiece-clamping elements (70; 71), these can be integrated in a closed hydraulic circuit, such that the lifting piston (102) is pressurized on both sides.

It is also conceivable to connect the lifting connections (141) and the return lifting connections (151) to the same pressure source. By means of the switching valve (144) connected upstream of the pressure chamber (142), the pressure chamber (142) can be pressurized simultaneously with the displacement chamber (152). The pressure chamber (142) and the displacement chamber (152) are subjected to the same pressure, for example the specified pressure value. The surface of the annular piston (102) turned towards the pressure chamber (142) is larger than the surface of the annular piston (102) turned towards the displacement chamber (152). When the switching valve (144) is switched to the flow position, the lifting rod (101) is extended. If the switching valve (144) is switched to the relief position, the air is displaced from the pressure chamber (142) through the throttle channel (147) into the surrounding area (1).

When setting up such an arrangement, the lifting connection (141) and the return lifting connection (151) can be directly connected to one another. Such connecting line can be connected to the pressure source. The switching valve (144) is connected downstream of the lifting connection (141).

The displacement chamber (152) can also be connected to a compressed air reservoir separate from the compressed air network or form a compressed air reservoir. The use of a spring energy store, for example in the form of a gas spring, a coil spring designed as a compression spring, etc., is also conceivable.

The selection of the workpiece-clamping elements (70; 71) released by means of a control unit, for example, depends on the geometry of the workpiece (2; 3) and on the processing steps provided in the processing cell (10). If, for example, a aperture is to be created in the workpiece (2; 3), the workpiece-clamping elements (70; 71) located in this region—after the workpiece (2; 3) has been clamped—are not released. The non-released workpiece-clamping elements (70; 71) remain in their retracted end position (72) as shown in FIG. 6. If the processing of one or more edges (4) is provided, only workpiece-clamping elements (70; 71) for which a minimum distance to the processed edge (4) of the workpiece (2; 3) is guaranteed are released. This minimum distance is five millimeters, for example.

In the released workpiece-clamping elements (70; 71), the pressure chamber (142) is pressurized, for example with a pressure medium, for example compressed air. This takes place, for example, by switching the, for example, electromagnetically actuated, bistable switching valve (144) of such workpiece-clamping element (70; 71). The telescopic tube (101) moves against the pressure of the displacement chamber (152) relative to the cylinder (81) into the extended end position (73), see FIG. 10. Thereby, the telescopic tube (101) is carried along with the suction plate (111) and the inner tube (105). The telescopic tube (101) is centered by means of the frustoconical recess (92). This increases the transverse rigidity of the workpiece-clamping element (70; 71), for example. The workpiece-clamping elements (70; 71) are held in the extended end position (73), for example by maintaining the pressure or by blocking the respective switching valve (144). For example, the lifting piston (102) is thus firmly clamped. In the non-released workpiece-clamping elements (71; 70), the pressurization of the displacement chamber (152) is maintained.

After the released workpiece-clamping elements (70; 71) have been extended, at least these are subjected to negative pressure. Thereby, the air is sucked out of the respective suction connection (161). In such workpiece-clamping elements (70; 71), the air is extracted through the inner tube (105) by the displacement rod (131). For example, the displacement rods (131) are sucked in the direction of the telescopic tubes (101) when the spring energy stores (137) are loaded. If negative pressure is applied to a retracted workpiece-clamping element (71; 70), the inner tube (105) together with the shaft seal ring (98) blocks the suction of such workpiece-clamping element (71; 70).

The workpiece (2; 3) is initially placed manually or by means of a handling device in the specified position on the workpiece support surfaces (113) of the suction plates (111). Thereby, the workpiece is placed against, for example, extendable contact pins for centering. The workpiece (2; 3) is pulled against the suction plates (111) and fixed to the workpiece table (30) by means of the workpiece-clamping fixture (33; 34). The air is further extracted through the suction channels (112) of the suction plates (111), the respective displacement rod (131) and the respective inner tube (105). If necessary, the suction pressure can be adjustable. For example, it can be reduced during the alignment of the workpiece. This makes it easier to correct the workpiece location (2; 3) during positioning, for example.

During the pivoting of the workpiece table (30) and during processing of the workpiece (2; 3) or workpieces (2, 3), the media control of the workpiece-clamping elements (70; 71) remains unchanged. The workpiece (2; 3) is thus held securely in its position during processing.

During the main time of the processing cell (10), in which the last workpiece (2; 3) or the last group of workpieces (2; 3) clamped is processed, for example by cutting, the next workpiece (3; 2) or the next group of workpieces (3; 2) is prepared on the loading side (12) of the enclosure. Clamping on the workpiece-clamping fixture (34; 33) in the loading and removal position (38) is carried out as described above. The processing of the workpiece (2; 3) is carried out, for example, by means of an industrial robot arranged inside the enclosure (11), which carries a processing unit with a plurality of driven tools.

After processing is complete, the workpiece table (30) is pivoted in such a manner that the processed workpiece (2; 3) is in the loading and removal position (38). At the same time, the current loading side (61) is pivoted into the working chamber. No set-up of the workpiece (2; 3) or the workpieces (2; 3) is required in the working chamber. For example, the non-productive time for processing a batch of workpieces (2; 3) is limited to pivoting the workpiece table (30).

The processed workpiece (2; 3) is gripped by means of the handling device or by hand. The differential pressure between the suction pressure and the ambient pressure is reduced or the suction is switched off. The spring energy stores (137) are relieved and press the carrier disk (132) in the direction of the suction plate (111). The workpiece (2; 3) is lifted off the suction plates (111) by means of the displacement rods (131), see FIG. 12. The processed workpiece (2; 3) can now be removed from the workpiece-clamping elements (70; 71) with virtually no resistance. A new workpiece (3; 2) can then be clamped onto the workpiece table (30) for processing.

If the newly clamped workpiece has different geometric dimensions, other or additional workpiece-clamping elements (70; 71) can be used to fix the workpiece (2; 3). The release of further workpiece-clamping elements (70; 71) takes place as described above.

If individual workpiece-clamping elements (70; 71) are no longer required for processing further workpieces (3; 2), they are moved to the retracted end position (72). For example, the switching valve (144) is switched such that the pressure chamber (142) is connected to the surrounding area (1) via the throttle channel (147). The pressure in the displacement chamber (152) displaces the telescopic tube (101) into the retracted position.

In the exemplary embodiments described, the workpiece table (30) has a frame (31) that carries and/or stores two or more workpiece-clamping fixtures (33; 34). The workpiece-clamping fixtures (33, 34) can also be located, for example, in a common plane or in a plurality of mutually offset planes. The planes can be arranged horizontally or at an angle, for example. For example, the workpiece-clamping fixtures (33, 34) can then be moved relative to one another. Thereby, the direction of movement can be linear or along a curved path. The workpiece-clamping fixtures (33, 34) can be adjusted individually, in groups or together relative to the frame (31). Each of the workpiece-clamping fixtures (33; 34) has at least one loading and removal position (38) and at least one working chamber position. In the respective working chamber position, each workpiece (2, 3) clamped on the workpiece-clamping fixture (33; 34) can be processed by the processing unit of the industrial robot.

Combinations of the individual exemplary embodiments are also conceivable.

LIST OF REFERENCE SIGNS

1 Surrounding area
2 Workpiece
3 Workpiece
4 Edges of (2; 3)
5 Longitudinal direction
10 Processing cell
11 Enclosure
12 Loading side
21 Air supply device
22 Chip conveyor
23 Control cabinets
30 Workpiece table
31 Frame
32 Workpiece plate carrier
33 Workpiece-clamping fixture
34 Workpiece-clamping fixture
35 Pivot axis
36 Workpiece-clamping side
37 Workpiece-clamping side
38 Loading and removal position
39 End faces of (32)
41 Vertical carrier
42 Inner sides of (41)
43 Lower longitudinal carrier

44 Upper longitudinal carrier
45 Inner sides of (43, 44)
46 Feet
47 Bearing points
48 Roller bearing, slewing ring
51 Pivot drive
52 Drive motor of (51)
54 Carrier part
55 Carrier plates
56 Pivot pin
57 Sealing plates
61 Current loading side
62 Current working chamber side
70 Workpiece-clamping elements
71 Workpiece-clamping elements
72 Retracted end position
73 Extended end position
74 Operating position
81 Cylinder
82 Cylinder-piston unit
83 Cylinder bottom
84 Cylinder head cover
85 Cylinder jacket tube
86 Tie rods
91 Distribution cover
92 Recess, frustoconical in (91)
93 Feed-through recess of (91)
94 Bottom distribution plate
95 Inner wall of (94)
96 Protective tube
97 Protective cap
98 Shaft seal ring in (97)
99 Bottom ring
101 Telescopic tube, lifting rod
102 Lifting piston
103 Cylinder seal
104 Spring mounts in (101)
105 Inner tube
106 Wedge press connection
107 Annular gap
111 Suction plate
112 Suction channels in (111)
113 Workpiece support surface of (111)
114 Sealing ring
115 Clamping and guide sleeve
131 Displacement rod
132 Carrier disk
133 Thrust tube
134 Apertures
135 Channel
136 Jacket surface
137 Spring energy store, compression spring
141 Pneumatic connection, lifting connection
142 Pressure chamber
143 First feed channel
144 Switching valve
145 Valve slide
146 Second feed channel
147 Throttle channel
151 Pneumatic connection, return lifting connection
152 Displacement chamber
153 Return lifting channel
161 Pneumatic connection, suction connection
162 Suction channel
163 Opening cross-section of (162)
164 Inner chamber of (70, 71)

The invention claimed is:

1. A workpiece table (30), comprising:

a frame (31);

a first workpiece-clamping fixture (33) having a plurality of individually height-adjustable pneumatic workpiece-clamping elements (70; 71); and a second workpiece-clamping fixture (34) having a second plurality of individually height-adjustable pneumatic workpiece-clamping elements (70; 71), wherein the first workpiece-clamping fixture (33) and the second workpiece-clamping fixture (34) are movable relative to the frame (31), and wherein a workpiece-clamping side (36) of the first workpiece-clamping fixture (33) and a workpiece-clamping side (37) of the second workpiece-clamping fixture (34) are oriented in different directions such that, in a respective operating position, one of the workpiece-clamping sides is in a loading and removal position while the other is in a working chamber position.

2. The workpiece table (30) according to claim 1, wherein the first workpiece-clamping fixture (33) is adjustable between a working chamber position and a loading and removal position (38).

3. The workpiece table (30) according to claim 1, wherein the first workpiece-clamping fixture (33) and the second workpiece-clamping fixture (34) are arranged rigidly relative to one another on a workpiece plate carrier (32) that is adjustable relative to the frame (31).

4. The workpiece table (30) according to claim 3, wherein the workpiece plate carrier (32) is mounted so as to be pivotable relative to the frame (31) about a pivot axis (35) or rotatable about an axis of rotation.

5. The workpiece table (30) according to claim 3, wherein the workpiece plate carrier (32) can be locked relative to the frame (31).

6. The workpiece table (30) according to claim 3, wherein each of the workpiece-clamping elements (70; 71) is designed to be individually pneumatically or hydraulically height-adjustable relative to the workpiece plate carrier (32).

7. The workpiece table (30) according to claim 6, wherein each workpiece-clamping element (70; 71) has a cylinder-piston unit (82).

8. The workpiece table (30) according to claim 1, wherein each workpiece-clamping element (70; 71) comprises a suction plate (111) and a displacement rod (131), wherein the displacement rod (131) is movable relative to the suction plate (111) and is configured to lift a workpiece (2; 3) from the suction plate (111).

9. The workpiece table according to claim 1, wherein each workpiece-clamping element (70; 71) has a pressurized displacement space (152), such that the respective workpiece-clamping element (70; 71) is loaded towards a retracted end position (72).

10. A processing cell (10) comprising the workpiece table (30) according to claim 1, wherein the workpiece table (30) seals off an enclosure (11) of the processing cell (10) when the first workpiece-clamping fixture (33) is in a working position.

11. A workpiece table (30), comprising:

a frame (31);

a first workpiece-clamping fixture (33) having a plurality of individually height-adjustable pneumatic workpiece-clamping elements (70; 71); and a second workpiece-clamping fixture (34) having a second plurality of individually height-adjustable pneumatic workpiece-clamping elements (70; 71), wherein the first workpiece-clamping fixture (33) and the second workpiece-clamping fixture (34) are movable relative to the frame (31), and wherein a workpiece-clamping side (36) of the first workpiece-clamping fixture (33) and a workpiece-clamping side (37) of the second workpiece-clamping fixture (34) are arranged at an angle to one another, and wherein the workpiece-clamping side (36) of the first workpiece-clamping fixture (33) and the workpiece-clamping side (37) of the second workpiece-clamping fixture (34) are oriented in opposite directions.

* * * * *